July 24, 1962 H. R. WARREN 3,046,359

MAGNETIC HEADS

Filed Feb. 2, 1959

INVENTOR.
HENRY RAY WARREN
BY Morris L. Rabkin
ATTORNEY

United States Patent Office 3,046,359
Patented July 24, 1962

3,046,359

MAGNETIC HEADS

Henry Ray Warren, Haddonfield, N.J., assignor to Radio Corporation of America, a corporation of Delaware Filed Feb. 2, 1959, Ser. No. 790,458
12 Claims. (Cl. 179—100.2)

The present invention relates to magnetic heads, and more particularly to magnetic heads especially suitable for use in a scanning mechanism for video recording and reproducing equipment.

Magnetic recording and reproducing apparatus has been provided for video signals carrying television programs which makes use of a mechanism for scanning record tracks across a magnetic tape record in a direction transverse to the direction of movement of the tape. A mechanism for recording and reproducing transverse record tracks involves a wheel carrying four magnetic heads spaced ninety degrees apart. The magnetic tape is held in an arc against the periphery of the wheel by a shoe and moves in a direction perpendicular to the plane of the wheel. The wheel is rotated by an electric motor at high speed (for example, 240 revolutions per second). The tracks are scanned by the heads while the wheel rotates and the tape moves at a speed, for example, of fifteen inchs per second.

The magnetic video heads in the wheel are subjected to great stress, strain, and wear because of the high centrifugal force thereon. The high speed at which the heads travel over the tape, which is usually coated with magnetic oxides having abrasive characteristics, results in rapid head wear. The centrifugal force upon the heads, which may be ten or more pounds, is capable of quickly disturbing the precision relationships among the head elements which are necessary to make the heads operate over the entire frequency range occupied by the video signals. The precise signal gaps formed by the core elements of the head are especially vulnerable to alteration. Such alteration may be due to the high centrifugal forces and to wear either or both of which may cause the gaps to widen and thereby lower the frequency response of the head.

All of the foregoing difficulties are magnified by the requirement that the record tracks be quite narrow so as to conserve tape length and make it possible to record full television programs on a single reel of tape.

It is therefore a primary object of the present invention to provide an improved magnetic head capable of successful operation under conditions existing in a mechanism for recording video record tracks.

It is a further object of the present invention to provide an improved magnetic head having wide frequency band operating characteristics for recording and reproducing signals varying in frequency over a wide range of frequencies, such as used in color television.

It is a still further object of the present invention to provide an improved magnetic head for use in a rotating scanning mechanism which makes use of centrifugal forces developed during rotation to maintain the elements of said head in properly assembled relation.

It is another object of the present invention to provide an improved, miniature magnetic head which makes efficient use of all available signal flux.

It is still another object of the present invention to provide an improved magnetic head which is more easily constructed and which can be more readily installed in a rotating wheel scanning mechanism than heads heretofore available.

The present invention, briefly described, involves a tiny magnetic head assembly. A plurality of core elements are held together by a larger support structure having converging seats. The support structure is mounted on the rotatable wheel of the scanning mechanism so that the seats converge toward the periphery of the wheel. Two of the core elements are disposed each on separate ones of the seats. A signal gap is formed by the ends of these elements at the converging ends of the seats. The signal gap is retained in precisely formed relation by the centrifugal forces developed as the wheel rotates, these forces in conjunction with the converging seats urging together the converging, gap forming ends of the core elements by reason of the wedge-like action of the seats.

The invention itself, both as to its organization and method of operation, as well as the foregoing and other objects and advantages thereof, will become more readily apparent from a reading of the following description in connection with the accompanying drawing in which.

Figures 1, 2, 3, 4, 5, 6:
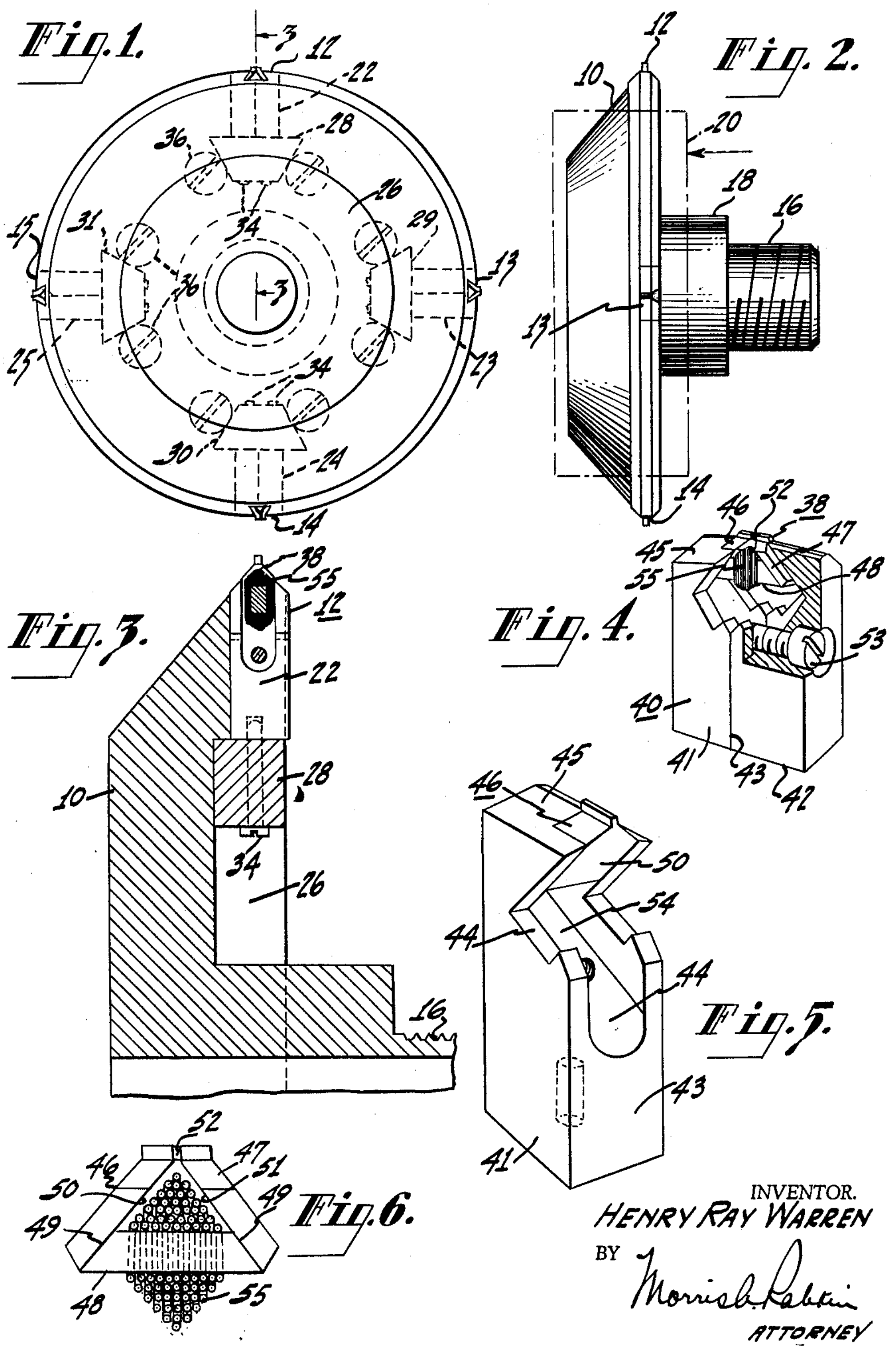
FIG. 1 is an end view of a rotatable head wheel carrying magnetic head units provided in accordance with the present invention.
FIG. 2 is a side elevation of the head wheel assembly shown in FIG. 1.
FIG. 3 is a fragmentary, sectional view taken along the line 3—3 in FIG. 1.
FIG. 4 is a perspective view of one of the head units shown in FIGS. 1, 2 and 3.
FIG. 5 is an enlarged, perspective view of one of the parts of the head unit shown in FIG. 4.
FIG. 6 is a view in elevation of the core and coil assembly of the head unit illustrated in FIG. 4.

Referring more particularly to the drawings, a rotatable head wheel 10 is shown in FIGS. 1 and 2. This wheel is frustoconical in shape. Four head units 12, 13, 14 and 15 are mounted in the head wheel 10 along the periphery thereof. The units are spaced ninety degrees apart. The head wheel has a threaded shaft 16 which is integral with a boss portion 18 and the body of the wheel. The threaded shaft 16 may be screwed into a suitable receptacle on the shaft of a motor for driving the head wheel. This motor is not shown in the drawings but may be an inductive motor of the synchronous type which rotates at high speed, such as 240 revolutions per second. A magnetic tape record 20 may be positioned in an arc around the periphery of the wheel 10, as shown by the dashed line in FIG. 2 of the drawing. The tape is driven by a tape driving system in the direction shown by the arrow in FIG. 2 and is adapted to be scanned by the rotating head units 12 to 15 as the tape travels in a direction parallel to the axis of the head wheel while the head wheel is rotating at the rapid rate mentioned above.

In a video recording system using the head wheel illustrated in the drawings, one television frame (525 lines) comprising 32 record tracks running transversely across the tape may be recorded on a length of tape one-half inch long and two inches wide. Reference may be had to an article entitled "How the RCA Video Tape Recorder Works" by Jerome L. Grever appearing in vol. No. 100, April 1958 of the publication "Broadcast News" published by RCA, Broadcast and Television Equipment Department, Camden, N.J., for a more detailed description of the operation of a television tape recorder using a head wheel of the type illustrated in the drawings. This article will also show the manner in which the motor for driving the head wheel is coupled to the head wheel.

The head wheel is machined with four radially oriented openings 22, 23, 24, and 25 extending to the periphery thereof for receiving the head units. An annular groove 26 in the rear face of the head wheel communicates with the openings 22 to 25. Separate mounting blocks 28, 29, 30 and 31 are disposed in this annular groove 26 adjacent the openings 22 to 25, respectively. Bolts 34 extend through holes in the mounting blocks 28 to 31 and engage holes located in the rear of the head units 12 to 15. These mounting blocks 28 to 31 bridge the openings 22 to 25 so that the head units are fastened in place. A pair of screws 36 are associated with each of the mounting blocks to prevent the mounting blocks from slipping back into the groove 26.

The front portion of each of the head units 12 to 15 is tapered to conform with the conical shape of the head wheel. In other words, the head units are essentially flush with the head wheel at the periphery thereof. However, the extremes of core assemblies 38 of the head units, which are described in more detail hereinafter, project above the surface of the head wheel.

The head wheel 10, mounting blocks 28, bolts 34 and screws 36 may be machined from a suitable non-magnetic material, such as aluminum. While the head wheel assembly shown in the drawings is particularly adapted for scanning a magnetic tape in a direction transverse of the direction of travel thereof, it will be appreciated that the head wheel assembly may also be used in other systems where one or more rotating head units are employed. For example, rotatable head units may be used in time division systems, or in delay systems wherein the tape is moved in a direction perpendicular to the axis of the head wheel. Other magnetic translating systems wherein it is desirable to rotate the magnetic heads, such as for tape editing, may also employ the head wheel provided by the instant invention. Many other applications for the head wheel provided by this invention will be apparent to those skilled in the art.

Referring, now, more particularly to FIGS. 3, 4 and 5, the head wheel 10 may be viewed in greater detail. The head units 12 to 15 are substantially identical. Consequently, reference may be had, by way of example, to the head unit 12 to completely point out the construction of all of the head units 12 to 15. The head unit 12 includes a supporting structure 40 and a core assembly 38. The supporting structure comprises a pair of supports which function as clamping blocks 41 and 42. These clamping blocks may be machined from aluminum or some other, suitable, non-magnetic material. Each of the blocks 41 and 42 has a side surface 43 which is adapted to be disposed in contact with a mating side surface 43 of the other block. The clamping blocks are symmetrical about the contacting surfaces 43.

The construction of one of the clamping blocks (the block 41) is shown in FIG. 5. This block is formed with substantially a V-notch 44 therein which extends from the end face 45 thereof (the face which is adapted to contact the tape) to the side surface 43 of the block. The notch 44 is grooved to provide a channel or seat 54. The seat 54 opens at the end face 45 where it is disposed at an acute angle with respect to the end face 45. A pole tip element 46 of the core assembly 38 is seated in the seat 54.

The core assembly 38 includes a pair of pole tip elements 46 and 47 and a core member 48. The core member 48 is generally trapezoidal in shape. This core member has end faces 49 which converge toward each other in a direction from the lower to the upper face thereof and are disposed at an angle of about forty-five degrees with respect to the bottom face thereof. The angle of inclination of the end faces with respect to the bottom of the core member 48 may vary somewhat from forty-five degrees. The core member 48 is constructed of a high permeability material, such as ferrite, so as to provide a low reluctance path for magnetic flux through the core. The pole tip elements 46 and 47 are desirably constructed from a material which is physically hard but has high magnetic permeability, such as Alfenol. The pole tip elements are seated in the seats 54 in the clamping blocks 41 and 42. It may be noted that the seats provided by the channels 54 converge toward each other as they approach the end faces 45 of the blocks, when the blocks are disposed in assembled relationship. These seats are inclined at such an acute angle with respect to the end faces that the angle defined by the interior side faces 50 and 51 of the pole tip elements 46 and 47, respectively, is substantially ninety degrees. Thus, the core member 48 will be at the hypotenuse of a right triangle. The extremes of the pole tip elements 46 and 47 which project through the end faces 45 of the respective clamping blocks are tapered and flattened at the top thereof to provide a very small, flat area at the top of each pole tip. Each pole tip has a narrow, rectangular flat face at the signal gap end thereof. The inner surface of each pole tip is tapered from a relatively wide region to the narrow rectangular gap region.

The ends of the pole tips 46 and 47 which are disposed adjacent each other form the signal gap of the head therebetween. This signal gap is filled by a spacer 52 having a slight thickness (approximately 100 microinches). The spacer 52 may be of some non-magnetic material such as quartz. The spacer material may be evaporated on the pole tips. The entire core assembly may be of miniature size. For example, the pole tip elements may be approximately 0.1 inch long at their longest point, 0.066 inch wide, and 0.35 inch thick. The core member may be approximately 0.17 inch long at its longest dimension, 0.05 inch thick, and 0.05 inch wide. The above dimensions are given solely for the purpose of illustration.

When the core assembly is mounted in the assembled clamping blocks 41 and 42, the blocks may be held together in assembled relationship by means of a clamping screw 53 which fits into a threaded hole running through the blocks. The core member 48 may be held in position by means of cement applied to the inclined end faces 49 thereof. Alternatively, the opening provided by the unoccupied portions of the V-notches 44 in the assembled clamping blocks may be partially filled with casting resin (not shown).

A signal coil 55 is wound around the core member 48. This coil is constructed by winding successive layers or turns around the core member with each layer having fewer turns than the previously wound layer. In other words, a pyramidal winding is provided around the core member 48. This winding extends to a point directly below the signal gap. Thus, fringe flux emanating from the gap threads at least the upper few turns of the coil 55 and induces signal voltage into the coil. This increases the signal output obtainable from the head. The nature of the coil winding will be best seen in FIG. 6 of the drawings. Another advantage of the coil assembly is the relatively narrow gap region. This region is obtained without sacrificing core cross-sectional area, which would reduce the amount of magnetic flux that could pass through the core, by providing a tapered region adjacent the gap region of each pole tip. The coil assembly is arranged to overcome the increased amount of fringe flux which would be established between the opposed surfaces of the pole tips 46 and 47, due to the increase reluctance of the tapered and narrowed pole tips with respect to the reluctance of the air. This is because the coil extends into the fringe flux area and utilizes all of the fringe flux.

In operation, the electronic circuitry, such as amplifier, oscillator, and the like, may be connected to the coils of the head units by means of a slip ring arrangement. The head units are revolved around the axis of the head wheel at a high rotational velocity. It has been found that at least 10 pounds of centrifugal force are applied at each head unit 12 to 15. Accordingly, the head units tend to be urged in a direction away from the axis of the head wheel. The head units are restrained by means of the mounting blocks 28 to 31. However, the core assemblies are urged by the centrifugal force outwardly from the head wheel. It will be observed that the radially outwardly converging seats define a wedge. This wedge forces the pole tip elements 46 and 47 toward each other as a result of the centrifugal force acting on the core assembly when the wheel 10 rotates. Thus, the pole tip elements will be maintained in suitable relationship during operation. The signal gap formed by the proximate ends of the pole tip elements is therefore maintained in exact position. The core member 48 aids in maintaining the assembled relationship of the pole tip elements 46 and 47, since the converging side faces 49 of the core member direct all the centrifugal force on the core member against the pole tip elements. Thus, centrifugal forces are utilized in keeping the core assembly in properly assembled relationship and in maintaining the signal gap of proper size. The pole tips 46 and 47 and the core member 48 may, at most, slide along the seats. The signal gap defining ends of the pole tips are maintained in contact with the gap spacer 52. The ends of the pole tips will be in proximate relationship and the signal gap will remain formed, regardless of pole tip wear and despite the abrasive action of the tape.

The magnetic head provided by the present invention has an exceptionally wide frequency response sufficient to cover the entire signal range used in color television. These desirable signal translating characteristics may be attributed to the features of the magnetic head which (*a*) makes use of the centrifugal force exerted on the core assembly to maintain the minute signal gap of proper size, (*b*) enables the signal coil to pick up any fringe flux around the signal gap because of the disposition of the coil in the core assembly, and (*c*) involves the relative size of the pole tips in the signal gap area and the core member and pole tips in the area away from the signal gap. It will be observed that the core is much smaller in cross sectional area at the signal gap than in the region away from the signal gap. The dimensions of the core members which were given by way of example of the foregoing description illustrate, for example, that the cross sectional area of the core member 48 is approximately 25 times greater than the cross sectional area of the pole tips in the region adjacent the signal gap.

From the foregoing description, it will be apparent that I have provided an improved magnetic record head assembly by means of which longer life, greater bandwidth and greater fidelity of reproduction can be obtained. While I have shown a magnetic head assembly according to one form of my invention, various components and elements useful therein, as well as variations in the core assembly itself, all coming within the spirit of the invention, will, no doubt, readily suggest themselves to those skilled in the art. Hence, I desire that the foregoing be considered merely as illustrative and not in any limiting sense.

What is claimed is:

1. A magnetic head which comprises a triangular core having a signal gap adjacent one apex thereof, a signal coil wound around said core on the portion thereof opposite to said gap with said coil being wound away from said core portion and extending sufficiently close to said gap to cause fringe flux emanating from said gap to thread at least the upper turns of said coil, said coil having a plurality of successive layers of turns with successive ones of said layers having a lesser number of turns than preceding layers, the upper one of said layers being disposed immediately adjacent to said signal gap.

2. A magnetic head which comprises a core member, a pair of pole tips extending from said core member toward each other to establish a signal gap therebetween and define a triangular opening between said tips and said member, and a signal coil wound around said core member and extending sufficiently close to said gap to cause fringe flux emanating from said gap to thread at least the upper turns of said coil.

3. A magnetic head for cooperation with a magnetic record which comprises a core structure defining a path for magnetic signal flux therein, said core structure having a signal gap therein and being adapted to be disposed with its said signal gap adjacent said record, portions of said core structure positioned on opposite sides of said gap being disposed with opposed surfaces thereof facing each other, at least one of said opposed surfaces presenting a surface area which is larger in regions away from said signal gap than more closely adjacent thereto, and a signal coil having a plurality of turns wound around said core structure between said opposed surfaces and having turns adjacent said regions presenting relatively lesser surface areas.

4. A magnetic head which comprises a core structure having at least three elements, two of said elements having end portions adapted to be disposed adjacent each other to define a signal gap therebetween, said two elements also having opposed side surfaces diverging from each other in a direction away from said gap, said side surfaces being tapered in a direction toward said gap to present regions of progressively smaller surface area approaching said gap, a third element between said two elements, and a coil having a plurality of successive layers of turns wound around said third element with successive ones of said layers having a lesser number of turns than preceding layers, at least the top layer of said turns extending between said opposed side surfaces adjacent the tapered portions thereof to a point directly below said gap to cause fringe flux emanating from said gap to thread at least said top layer of turns.

5. A magnetic head assembly for cooperation with a magnetic record comprising a pair of blocks of non-magnetic material having side faces disposed in face to face relationship when said blocks are in assembled relation, said blocks having end faces intersecting said side faces, each of said blocks having a channel therein extending inwardly from said side and end faces and inclined at an acute angle with respect to said end face of said block, a core assembly including a pair of pole tips having end portions adapted to form a signal gap therebetween, a core member disposed between said pole tips, a signal coil around said core member, said pole tips being disposed in separate ones of said channels, a rotatable wheel for carrying said blocks and core structure, means for clamping said blocks together with said channels in mutually inclined converging relation whereby to retain said core assembly therein, and means for mounting said clamped blocks on said wheel with said contacting side faces disposed along a radius of said wheel and said end faces facing the periphery of said wheel.

6. A magnetic head assembly comprising a pair of blocks of non-magnetic material having side faces disposed in face to face relationship when said blocks are in assembled relation, said blocks each having an end face intersecting the side face thereof, each of said blocks having a channel therein extending inwardly from said side and end faces and inclined at an acute angle with respect to said end face of said block, a core assembly including a pair of pole tips each disposed in a separate one of said channels, said pole tips having end portions adapted to form a signal gap therebetween, a core member disposed between said pole tips, a signal coil around said core member, and means for clamping said blocks together with said channels in mutually inclined converging relation, whereby said core assembly is retained between said blocks with said signal gap formed a given distance above said end faces.

7. A magnetic head assembly comprising a pair of blocks of non-magnetic material having side faces disposed in face to face relationship when said blocks are in assembled relation, said blocks each having an end face intersecting the side face thereof, each of said blocks having a notch therein extending inwardly from said end face and said side face, the notch of each block being grooved to provide a channel extending inwardly from and inclined at an angle less than ninety degrees with respect to said end face of said block, the channel in one block converging toward the channel of the other block when said blocks are in assembled relation, a core assembly including a pair of pole tips each disposed in a separate one of said channels, said pole tips having end portions adapted to form a signal gap therebetween, a core member disposed between said pole tips, a signal coil around said core member and extending to a point directly below said signal gap to cause fringe flux emanating from said gap to thread at least the upper turns of said coil, and means for clamping said blocks together in said face to face relationship with said channels in mutually inclined converging relation, whereby said core assembly is retained between said blocks with said signal gap formed a given distance above said end faces.

8. A magnetic head assembly comprising a pair of blocks of non-magnetic material having side faces disposed in face to face relationship when said blocks are in assembled relation, said blocks each having an end face intersecting the side face thereof, each of said blocks having a V-notch therein extending inwardly from said end face and said side face, the notch of each block being grooved to provide a channel extending inwardly from and inclined at an acute angle with respect to the end face thereof, the channel in one block converging toward the channel of the other block in the direction of said end faces when said blocks are in assembled relation, a core assembly including a pair of core parts each disposed in a separate one of said channels, said core parts having end portions adapted to form a signal gap therebetween, a core member disposed between said core parts, a signal coil wound on said core member and having a plurality of layers of turns with successive ones of said layers having a lesser number of turns than preceding layers, at least the upper one of said layers being disposed immediately adjacent to said signal gap, means to clamp said blocks together in said face to face relationship with said channels in mutually inclined converging relation, whereby said core assembly is retained between said blocks with said signal gap formed a given distance above said end faces.

9. A magnetic head assembly comprising a pair of blocks of non-magnetic material having side faces disposed in face to face relationship when said blocks are in assembled relation, said blocks each having an end face intersecting the side face thereof, each of said blocks having a V-notch therein extending inwardly from said end face and said side face, the notch of each block being grooved to provide a channel extending inwardly from and inclined at an acute angle with respect to the end face thereof, the channel in one block converging toward the channel of the other block in the direction of said end faces when said blocks are in assembled relation, a core assembly including a pair of core parts each disposed in a separate one of said channels, said core parts having end portions adapted to form a signal gap therebetween, a core member disposed between said core parts, a signal coil wound on said core member and having a plurality of layers of turns with successive ones of said layers having a lesser number of turns than preceding layers, at least the upper one of said layers being disposed immediately adjacent to said signal gap, means to clamp said blocks together in said face to face relationship with said channels in mutually inclined converging relation, whereby said core assembly is retained between said blocks with said signal gap formed a given distance above said end faces, a rotatable wheel for carrying said blocks and core assembly in assembled relation, and means for mounting said clamped blocks on said wheel with said contacting side faces disposed along a radius of said wheel and said end faces flush with the periphery of said wheel.

10. A magnetic head assembly comprising a pair of blocks of non-magnetic material having side faces disposed in face to face relationship when said blocks are in assembled relation, said blocks each having an end face intersecting said side face thereof, each of said blocks having a V-notch therein extending inwardly from said end face and said side face, the notch of each block being grooved to provide a channel extending inwardly from and inclined at an acute angle with respect to said end face thereof, the channel in one block converging toward the channel of the other block in the direction of said end faces when said blocks are in assembled relation, a core assembly including a pair of core parts each disposed in a separate one of said channels, said core parts having end portions adapted to form a signal gap therebetween, the opposed surfaces of said core parts when said core parts are disposed in said channels being tapered in a direction toward said gap to present regions of progressively smaller surface area approaching said gap, a core member disposed between said core parts, a signal coil wound on said core member and having a plurality of layers of turns with successive ones of said layers having a lesser number of turns than preceding layers, at least the upper one of said layers being disposed immediately below said gap and between said opposed surfaces adjacent to the regions presenting relatively smaller areas, means to clamp said blocks together in said face to face relationship with said channels in mutually inclined converging relation, whereby said core assembly is retained between said blocks with said signal gap formed a given distance above said end faces.

11. A magnetic head assembly as claimed in claim 10, and wherein the angle defined by said opposed surfaces of said core parts when disposed in said channels is substantially ninety degrees, said core member being disposed between said core parts at the hypotenuse of a right triangle.

12. A magnetic head assembly as claimed in claim 10, and including a spacer constructed of non-magnetic material positioned in said gap between said end portions of said core parts.

References Cited in the file of this patent

UNITED STATES PATENTS

| | | |
|---|---|---|
| 2,144,844 | Hickman | Jan. 24, 1939 |
| 2,536,260 | Burns | Jan. 2, 1951 |
| 2,662,120 | Anderson | Dec. 8, 1953 |
| 2,813,924 | Coutant et al. | Nov. 19, 1957 |
| 2,866,012 | Ginsburg et al. | Dec. 23, 1958 |
| 2,892,041 | Rubens | June 23, 1959 |